United States Patent [19]

Johansson et al.

[11] Patent Number: 5,160,540
[45] Date of Patent: Nov. 3, 1992

[54] METHOD FOR PRODUCING OF CONCRETE WITH CONTROLLABLE DENSITY

[75] Inventors: Ingemar Johansson; Kjell Svedman, both of Ange, Sweden

[73] Assignee: Danes Verkstader AB, Ange, Sweden

[21] Appl. No.: 725,414

[22] PCT Filed: Jul. 5, 1988

[86] PCT No.: PCT/SE88/00369
§ 371 Date: Jan. 8, 1990
§ 102(e) Date: Jan. 8, 1990

[87] PCT Pub. No.: WO89/00153
PCT Pub. Date: Jan. 12, 1989

Related U.S. Application Data

[63] Continuation of Ser. No. 458,639, Jan. 8, 1990, abandoned.

[30] Foreign Application Priority Data

Jul. 8, 1987 [SE] Sweden ................................. 8702806

[51] Int. Cl.$^5$ ........................ C04B 21/00; C04B 22/04
[52] U.S. Cl. ..................................... 106/672; 106/605; 106/646
[58] Field of Search ........................ 106/605, 646, 672

[56] References Cited

U.S. PATENT DOCUMENTS

| | | | |
|---|---|---|---|
| 3,679,445 | 8/1969 | Howe | 106/88 |
| 3,758,319 | 10/1970 | Ergene | 106/88 |
| 3,804,058 | 4/1974 | Messenger | 166/292 |
| 3,979,217 | 9/1976 | Suton | 106/88 |
| 4,142,910 | 3/1979 | Kraemer et al. | 106/97 |
| 4,398,958 | 8/1983 | Hodson et al. | 106/90 |
| 4,828,618 | 5/1989 | De Chiffre et al. | 106/87 |

OTHER PUBLICATIONS

"Parry's Chemical Eng. Handbook", McGraw Hill 6th Ed. ©1984 pp. 1–17.

Primary Examiner—Mark L. Bell
Assistant Examiner—Alan Wright
Attorney, Agent, or Firm—Michael, Best & Friedrich

[57] ABSTRACT

A method for producing a concrete with a controllable density, which at the density of 1200 kg/m$^3$ has a compression strength of at least 3.5 MPa and after that linearly increases to at least 19 MPa at 2,000 kg/m$^3$, characterized in mixing a base concrete mixture mainly consisting of cement and water with a porosity mixture mainly consisting of cement, water and a foaming agent so that the foaming agent constitutes at least approximately 5% by volume of the porosity mixture, and that the resultant mixture of the base concrete mixture and the porosity mixture is moulded in a conventional manner.

7 Claims, No Drawings

METHOD FOR PRODUCING OF CONCRETE WITH CONTROLLABLE DENSITY

This is a continuation of U.S. patent application Ser. No. 458,639 filed Jan. 8, 1990, now abandoned.

The present invention concerns a method for producing concrete members having a uniform density over a range of densities, particularly within the range of 800-2000 kg/m$^3$, where also the compression strength of the resultant concrete can be kept high, e.g. more than 12 MPa at a density of 1600 kg/m$^3$.

It has proved to be that production of concrete mass preferably is made at stationary concrete stations and that the concrete mass is moulded in situ in moulds to transportable units or is transported to the building place in a liquid shape to be moulded and hardened in moulds. The advantages are several. Among others can be mentioned:

1. A stationary equipment can be made more technically complete.
2. The capacity can be made bigger for a stationary plant.
3. The access to laboratory equipment for the testing of the materials used and the finished product makes the concrete to be produced with a higher accuracy.
4. The working place does not need to be saddled with concrete mixer, stores of cement and ballast and so on.

Therefore most industrial countries on the whole have complete concrete stations for delivery of concrete mass to the working places.

The concrete with the greatest range of application today consists of a mixture of cement, ballast, which can be in the form of sand, gravel, or stone, and water and often some additives for changing the consistency of the mixture. While the density of the stabilized concrete is normally about 2300 km/m$^3$, the strength requirements for the concrete can vary. The test method for the compression strength has been standardized and is carried out, in general by forming a cube of concrete with a side of 150 mm and with certain requirements of side-parallelism and angle-accuracy. After hardening of the cube at room temperature of 20° C. a varying number of days, in most cases 8 and 28 days, the cube will be tested by pressing the cube between flat surfaces. The highest load applied to the cube is recorded before the cube starts cracking. A value of the compression strength around 60 MPa can be achieved under certain circumstances, but maximum values of about 40 MPa are most common.

For structures with lower strength requirements the expense of the concrete can be cheapened particularly by increasing the ratio of weight between the participating water and cement in the concrete mass, the so-called water-cement factor. This factor is indicated as vct.

The demand for relatively light-weight concrete structures has increased. However, the need for relatively high compression strength in these structures often cannot be comprimised and can be difficult to achieve. For example, known methods for forming concrete including the use of ballast can produce concrete having a density in the range of 2400 to 1600 Kg/m$^3$, however, a compression strength of 12 MPa can be achieved over this range of densities only by the careful practice of manufacturing techniques. Also, even in applications not requiring 12 MPa of compression strength, densities in the range of 2000 to 800 Kg/m$^3$ have been difficult to achieve.

Another known method for forming relatively low-density concrete includes the introduction of air into the liquid base concrete mixture. The blowing of air into the liquid base concrete mixture forms air porousities in the concrete reduces the density of the resultant concrete mass, and makes the concrete less affected by frost, among other factors, when used in bridges and in outdoor-balconies. However, the compression strength of the concrete mass will be dramatically lowered and the porousities can be so irregularly spread throughout the resultant mass that, at a density as low as 2000 kg/m$^3$, reliability and usefulness of this method is debatable.

Also, another method of forming relatively light-weight concrete including the mixing of a lighter ballast into the base concrete mixture to lower the density has been tested. This method has not, however, rendered any better results. Rather, the practical limits for compression strength will be reached before densities below 2000 Kg/m$^3$ are attained.

However, it has been proved that a concrete with closed porousities, so-called "porous concrete", with densities below 500 kg/m$^3$, can be achieved by adding a foaming agent, available under known trademarks present on the market, to water and thereafter a certain amount of cement to form the base concrete mixture. This porous concrete must be produced at the moulding place, and is characterized by relatively low coefficients of thermal conductivity, which sometimes can be an advantage. The compression strength of such porous concrete, however, hardly ever exceeds 1. In order to raise the density of the porous concrete to greater than 500 kg/m$^3$, a certain amount of ballast can be added to attain a density as high as 700 kg/m$^3$ often the ballast which has been added will settle and will result in an unacceptable quality of the concrete.

The range of densities between 800 and 2000 kg/m$^3$ thus have been difficult to achieve. Cement mixers intended for use to produce densities in regions of this spectrum of densities are certainly present on the market, but they have shown many drawbacks. The production of the concrete mass is made in proximity of the moulding place. Usually a mixture of cement, water and ballast first is produced in the machine. Separately water and foaming gent are mixed to form a porousity agent. The foam mixture is brought by an outlet pipe to the base cement mixture. These two mixtures are carefully mixed and, as soon as possible, are brought to the moulds. The method is complicated and an interruption, unforeseen or not, will make considerable extra work. Practically it also has been shown that it will be difficult to reach a compression strength of 12 MPa and certainly not with an acceptable repeatability at, e.g. a density of 1600 kg/m$^3$, which today is very desireable. This resultant density depends on the specific water-cement ratio (vct) which results after the introduction of the mixture of water and foaming agent to the base concrete mixture. Compensation for the added water in the porousity agent by mixing the base concrete mix with a low vct[-factor in the first produced cement mixture] does not work because the base mixture will be so viscous that the process is not possible to carry out.

Surprisingly, it has proved to be that a concrete with very good strength characteristics with a density in the range 800-2000 kg/m$^3$ can be produced by adding a porousity agent made of water, cement and a foaming agent, to a conventionally produced liquid concrete mass including cement, ballast and water, in a stationary concrete station, and mixing these components together. After moulding and hardening the resultant concrete mass will include small porousities and a density in the 800-2000 kg/m$^3$ range, depending on the mixing conditions. High values of compression strength also are obtained, probably because the pores formed in the concrete are very small, mainly below 3 mm, and are uniformly distributed, and that the water-cement ratio (vct) can be kept low in the base concrete mixture as well as in the porousity agent. The repeatability also has proved to be very high when the routines at the production site are standardized. The concrete mass necessary for the moulding can be calculated and produced completely at the concrete station if desirable, if the distance to the moulding place is not to large. Otherwise, the standard concrete mass produced at the concrete station can be transported to the working place, mixed together with the porousity agent and moulded. Mixing together the standard concrete mass and the porousity agent is a simple operation. Tests show that the mixing of the porousity agent, should be made quickly. The producing of the porousity agent is carried out separately, as mentioned above, in a simple, transportable, mixer.

The invention will be more specifically described in the enclosed claims and in the example below, where different concretes are produced with different densities and by different routines. Data and results from the tests are described in the accompanying table Compression strength has been determined according to the Swedish standard SS 13 11 11-13 where cubes of 150×150 mm have been moulded and tested at a concrete station accepted by the Swedish authorities. Compression according to SS 13 11 12, 5.1 and 5.2 has been excluded in order not to disturb the distribution of the pores in the material. Also storing in water according to 5.6 in the same standard has been excluded by the same reasons. Determination of density has been made on the same place according to SS 13 72 34.

EXAMPLE 1: Specimen No. 1-2

A normal concrete mass was produced in a laboratory scale in a simple mixer, aiming for a density of about 2200 kg/m$^3$ and a compression strength after 28 days hardening of about 40 MPa. The concrete mass was produced with vct=0.45. Besides a smaller amount of porousity agent was produced. The porousity agent was made in a smaller mixer and was made by mixing water and a foaming agent marketed under the trademark CELLEX and with a smaller amount of chemicals for stabilization of the foam according to the instructions accompanying the CELLEX. After that, cement powder was added to the porousity agent by stirring so a vct=0.48 was obtained. To 6 liters of the concrete mass, 0.6 liter of porousity agent was added during stirring. Test cubes were moulded from the concrete mixture without the porousity agent as well as from the latter resultant mixture with the porousity agent added. The cubes where tested at an accepted concrete station for compression strength and density (after both 8 and 28 days). The results of the compression strength test showed that, within this desired range of density, a concrete with a satisfactory compression strength was obtained after only 8 days of hardening, which was further improved after 28 days hardening. The surfaces of the fracture showed that small pores, none over 3 mm extension, could be seen and were uniformly distributed over the surface of the fracture.

EXAMPLE 2: Specimen No. 3-4

The purpose of this test was also to get a resultant concrete with a density of approximately 1600 kg/m$^3$. The base concrete mass, however, was produced in a conventional concrete mixer often used at the work site in order to produce smaller amounts of concrete mass. The porousity agent was added directly into the mixer during the rotation of the mixing container. For specimen 3, a delay in time of more than 1 minute was made for the adding of the porousity agent to the cement mixture. For specimen 4 the porousity agent was added without delay. The same good result as in example 1 was obtained for specimen 4, i.e. when the porousity agent was mixed in quickly, but some inferior result was obtained for specimen 3 with a delayed mixing.

EXAMPLE 3: Specimen No. 5-9

A series of tests were carried out mainly in the same way as for specimen 4 above, except that the mixing rate between the base concrete mass and the porousity agent was varied. As can be seen from the result a finished concrete was obtained in the difficult to attain range of density between 2000 and 800 kg/m$^3$ with very satisfactory values of compression strength which, however, naturally were lowered with corresponding lowered values of density.

We claim:

1. A method for producing a concrete with controllable density, which at the density of 1200 kg/m$^3$ has a compression strength of at least 3.5 MPa and after that linearly increases to at least 19 MPa at 2,00 kg/m$^3$, characterized in mixing a base concrete mixture mainly consisting of cement and water with a porousity mixture mainly consisting of cement, water and a foaming agent so that the foaming agent constitutes at least approximately 5% by volume of the porousity mixture, and that the resultant mixture of said base concrete mixture and said porousity mixtures is moulded in a conventional manner.

2. A method for producing a concrete according to claim 1, characterized in that the finished concrete has closed pores with a size which are generally below 3 mm.

3. A method for producing a concrete with controllable density, which at the density 1200 kg/m$^3$ has a compression strength of at least 3.5 MPa and at the density 2000 kg/m$^3$ has a compression strength of at least 19 MPa, said method comprising the steps of mixing a concrete mass mainly consisting of cement and water and a porousity mixture mainly consisting of cement, water and a foaming agent, the porousity mixture including at least 5% foaming agent by volume, and thereafter molding the resultant mixture.

4. A method as set forth in claim 3 wherein the concrete has closed pores, substantially all of which are below 3 mm in size.

5. A method for producing a concrete mass having a density between 300 kg/m$^3$ and 2000 kg/m$^3$ and having a compression strength, at a density of 1000 kg/m$^3$, of at least 3.0 MPa and that increases to at least 12, MPa at a density of 1600 kg/m$^3$, the method comprising the steps of:

(1) mixing a base concrete mixture of cement and water, (2) mixing a porousity agent of cement, water and a foaming agent, (3) mixing the porousity agent and the base concrete mixture, and (4) moulding the resultant concrete mass.

6. The method as set forth in claim 5 wherein the vct of the base concrete is approximately 0.45 and wherein the vct of the porousity agent is approximately 0.48.

7. The method as set forth in claim 5 wherein the resultant concrete mass has therein a plurality of closed pores substantially uniformly distributed throughout said mass and wherein each of said pores has a diameter of approximately 3 mm.

* * * * *

UNITED STATES PATENT AND TRADEMARK OFFICE
CERTIFICATE OF CORRECTION

PATENT NO. : 5,160,540
DATED : November 3, 1992
INVENTOR(S) : Ingemar Johansson, et al.

It is certified that error appears in the above-indentified patent and that said Letters Patent is hereby corrected as shown below:

In Col. 2, line 33 delete "1" and insert --1.5 MPa--.

In Col. 2, line 47 delete "gent" and insert --agent--.

In Col. 2, line 62 delete "[-".

In Col. 2, line 63 delete "]".

In Col. 4, after line 30 insert the "TABLE"; two copies of which are attached hereto. The "TABLE" appears as page 7 of the originally filed application.

In Col. 4, line 35 delete "2,00" and insert --2,000--.

Signed and Sealed this

Ninth Day of November, 1993

Attest:

BRUCE LEHMAN

Attesting Officer

Commissioner of Patents and Trademarks